Dec. 26, 1961     E. L. SMITH ET AL     3,014,841
PROCESS FOR SEPARATING ANTIBIOTICS PRODUCED
BY S. OSTREOGRISEUS CULTURE
Filed Sept. 17, 1958

[Flow chart:]

or an antibiotic mixture from which at least a portion of one of the factors has been removed by preferential crystallization from a solution of the original mixture in hot ethyl acetate or an antibiotic mixture from which at least a portion of another of the factors has been removed by acid extraction of the ethyl acetate solution from which at least a portion of the first factor has been removed.

→ MIXTURE OF 3 ANTIBIOTIC FACTORS PRODUCED BY CULTURING STREPTOMYCES OSTREOGRISEUS NRRL 2558

← WATER+ALCOHOL    lower monohydric alcohol or lower dihydric alcohol.

↓ SUPPORT SOLUTION ON SOLID ABSORBENT AND PACK IN COLUMN

↓ COLUMN PACKED WITH SUPPORTED SOLUTION OF ANTIBIOTIC FACTORS

← AROMATIC HYDROCARBON    or a mixture of chloroform and cyclohexane, carbon tetrachloride or a higher ether or a mixture of ethyl acetate and cyclohexane, carbon tetrachloride or a higher ether.

TO DEVELOP COLUMN

↓ COLLECT 1ST FRACTION CONTAINING SUBSTANTIALLY ALL OF ONE OF THE FACTORS    collection of first fraction continued as long as reddish-brown color is given on ferric chloride spot tests.

↓ COLLECT 2ND FRACTION CONTAINING SUBSTANTIALLY ALL OF ANOTHER FACTOR    collection of second fraction continued until green color given on ferric chloride spot tests fades.

SOLUTION OF 1ST FACTOR IN AROMATIC HYDROCARBON    SOLUTION OF 2ND FACTOR IN AROMATIC HYDROCARBON    SOLUTION OF 3RD FACTOR IN AROMATIC HYDROCARBON collection of third fraction continued to the fading of the color which is resumed on ferric chloride spot tests when third antibiotic factor begins to come through.

INVENTORS
ERNEST LESTER SMITH
KARL HEINZ FANTES
WILLIAM HAROLD CULLEN SHAW
BY *Bacon & Thomas* ATTORNEYS

United States Patent Office 3,014,841
Patented Dec. 26, 1961

3,014,841
PROCESS FOR SEPARATING ANTIBIOTICS PRODUCED BY S. OSTREOGRISEUS CULTURE
Ernest Lester Smith, North Harrow, Karl Heinz Fantes, Bushey, and William Harold Cullen Shaw, Penn, England, assignors to Glaxo Laboratories Limited, Greenford, England, a British company
Filed Sept. 17, 1958, Ser. No. 761,481
Claims priority, application Great Britain Sept. 20, 1957
11 Claims. (Cl. 167—65)

This invention is concerned with improvements in or relating to antibiotics, and more particularly with the separation of antibiotic factors present inter alia in an antibiotic material, designated by us as E.129, to obtain certain factors therefrom in purified form.

In application Ser. No. 602,634, filed August 7, 1956, and now abandoned in favor of a continuation-in-part application Serial No. 767,343, filed October 15, 1958, we have described the production of a novel antibiotic produced by the fermentation of *Streptomyces ostreogriseus* (NCIB 8792, NRRL 2558) on or in a suitable medium. This novel antibiotic has been designated by us as E.129. It appears that this antibiotic consists of a number of factors some of which factors are contained in other antibiotics previously isolated. Thus, E.129 consists principally of three factors, namely factors A, B and Z. Of these factors, A and Z are identical with factors designated by W. D. Celmer and B. A. Sobin as PA 114 A and PA 114 B (Antibiotics Annual 1955–56, page 437). Our factor B is, however, a new compound and is described in application Ser. No. 637,667, filed February 1, 1957, and now abandoned in favor of continuation-in-part application Ser. No. 806,295, filed April 14, 1959.

As stated in application Serial No. 637,667, the infrared spectrum of factor B shows absorption maxima at the following wave-lengths:

2.75, 2.83, 2.97, 3.37, 3.48, 5.79, 5.99, 6.17, 6.33, 6.60, 10.25, 10.36, 10.76, 11.24, 11.51, 12.45, and 13.33 $\mu$.

The figures stated are accurate to within $\pm 0.01\mu$ at the lower end of the scale and $\pm 0.05\mu$ at the upper end.

The ultra-violet absorption spectrum of factor B in ethanol shows a weak maximum at 215 m$\mu$.

$$(E_{1\,cms}^{1\%} = 650)$$

Factor B is readily soluble in lower alcohols, ketones, esters, methylene dichloride, acetic acid, dioxane and dimethylformamide. It is moderately soluble in benzene and slightly soluble in water and the lower ethers. It is almost insoluble in light petroleum and carbon tetrachloride. Factor B has an optical rotation $[\alpha]_D^{20}$ of $-17.4°$ (c. 0.4 in methanol); chemical analysis of factor B gives carbon 63.25%, hydrogen 7.10%, nitrogen 8.05% and oxygen 21.60%. The molecular weight of factor B as determined by the Rast camphor method is 650.

Apart from the characteristics described above factor B has a characteristic anti-bacterial spectrum as follows:

| Organism | | Minimum inhibitory concentration, γ/ml. |
|---|---|---|
| Serial twofold dilutions in nutrient broth; Incubated 37° C., 48 hrs.: | | |
| Sarcina lutea | NCTC 611 | 0.32 |
| Do | NCIB 8166 | 0.625 |
| Micrococcus flavus | | 0.32 |
| Staphylococcus aureus clinical isolate | | 20.0 |
| Staphylococcus aureus streptomycin laboratory resistant strain | | 10.0 |
| Staphylococcus aureus | NCTC 7447 | 5.0 |
| Staphylococcus saprophyticus | NCTC 7292 | 10.0 |
| Staphylococcus lactis | NCTC 7564 | 0.62 |
| Staphylococcus afermantans | NCTC 7749 | 1.25 |
| Staphylococcus aureus | | 10.0 |
| Bacillus cereus | NCTC 6349 | 20.0 |

| Organism | | Minimum inhibitory concentration, γ/ml. |
|---|---|---|
| Serial twofold dilutions, etc.—Con. | | |
| Bacillus mycoides | NCTC 6093 | 20.0 |
| Bacillus megatherium | NCIB 8508 | 20.0 |
| Staphylococcus albus | NCTC 7292 | 10.0 |
| Serial twofold dilutions papain digest broth+5% horse serum: | | |
| Streptococcus faecalis | Strain 1 | 2.5 |
| Do | Strain 2 | 5.0 |
| Staphylococcus aureus | Strain 1 | 5.0 |
| Do | Strain 2 | 10.0 |

It is said in the literature that factors PA 114 A and PA 114 B (our factors A and Z respectively) act synergistically against various pathogenic bacteria and we have shown in our specification No. 714,171 that our new factor B also acts synergistically with PA 114 B (Z), mixtures of factors B and Z having a greater antibiotic action than corresponding mixtures of factors A and Z, for example as judged by mouse-protection tests.

The obtaining of factors A, B and Z in pure form from crude E.129 is clearly highly desirable in order to make possible the formulation of mixtures of pure factors having a controlled antibiotic activity and to prepare synergistic mixtures of optimal activity. The separation of the various factors has however hitherto proved difficult to carry out and methods little suited to commercial operation have for example been practised.

We have now found that the various factors present in crude E.129, and particularly the E.129 factors A, B and Z, can be readily separated from one another and obtained in at least partially purified form by subjecting mixtures containing two or more of these factors to partition chromatography under certain conditions hereinafter set forth.

In the technique of partition chromatography an absorbent material is made to absorb a liquid phase called the static phase and the absorbent bearing the static phase is then eluted with another liquid phase called the mobile phase and which is generally at least partially immiscible with the static phase. The absorbent material does not in general adsorb the substances to be separated as is the case in adsorption chromatography but acts as a support for the static liquid phase. Indeed this absorbent should preferably exhibit little if any adsorptive properties for the components of the mixture to be separated. Separation of the components of the mixture thus results through exchange between the two liquid phases.

According to the invention, therefore, we provide a process for the separation of factors A, B and/or Z herein referred to from an antibiotic mixture containing two or more of said factors in which the antibiotic mixture is subjected to partition chromatography using as static liquid phase a mixture of water and a water-miscible substantially polar organic solvent and as mobile phase a substantially non-polar water-immiscible organic solvent, to separate one or more of said factors from said mixture.

The method according to the invention is simply carried out and can readily be applied on the commercial scale.

The method of the invention is illustrated by the drawing which is a self-explanatory flow sheet.

The antibiotic mixture to be separated may conveniently be crude E.129 as derived directly by the culture of an E.129 producing strain of *Streptomyces ostreogriseus* for example as described in application Serial No. 767,343. However, it may be advantageous to subject the antibiotic mixture to preliminary treatment to remove at least some of the factor A therefrom if present. This can readily be done by dissolving the antibiotic mixture in a solvent in which it is less soluble than the other factors so that factor A preferentially crystallises out. A suitable solvent is ethyl acetate and, according to a feature of the invention, therefore, the starting material used in the partition chromatography is crude E.129 which has been treated to remove at least a part of the factor A therefrom.

In addition the antibiotic mixture to be separated according to the invention may be subjected to preliminary treatment to remove at least a part of the factor Z therefrom. This may be achieved, for example, by acid extraction of the ethyl acetate filtrate obtained after removal of at least part of the factor A in the manner described. The process of acid extraction of factor Z is described in application Ser. No. 735,941, filed May 19, 1958.

If the antibiotic mixture has been subjected to treatment to remove at least a part of any factor A and/or factor Z therefrom, then the separation of factor B by subsequent partition chromatography according to the invention is facilitated. It is, therefore, preferred to use as starting material crude E.129 which has been subjected to either one or preferably both of the preliminary treatments referred to above for removal of factor A and/or factor Z.

In the process according to the invention preferred solvents for the mobile phase are aromatic hydrocarbon solvents such as benzene and toluene, or a mixture of such solvents. Such solvents may be diluted with one or more solvents having low solvent power for the E.129 factors, e.g. cyclohexane, carbon tetrachloride or a higher ether, e.g. isopropyl ether. Another convenient mobile phase is chloroform or ethyl acetate diluted with a solvent of low solvent power such as mentioned above. In practice it is preferred that the mobile phase should be diluted with a solvent of low solvent power until factors Z and A have been eluted from the column; the factor B being then eluted with undiluted solvent.

The static phase preferably consists of a mixture of water and a lower monohydric or dihydric alcohol, for example methyl alcohol, ethyl alcohol, propyl alcohol, ethylene glycol or propylene glycol. Of these methyl and ethyl alcohol are preferred, and a particularly preferred solvent for the static phase is one consisting of methanol and water in the proportions of 2:1 to 1:2, preferably about 3 parts of methyl alcohol to 2 parts of water. In general, it has been found that at the lower methyl alcohol concentrations the separation of the E.129 factors is better but the capacity of the chromatographic column is less than at higher concentrations of methyl alcohol.

The supporting absorbent solid for the static phase may be any convenient porous solid which exhibits no substantial adsorptive properties towards the antibiotic factors. Kieselguhr is at present preferred but other absorbents which are very satisfactory are powdered cellulose, starch and silica.

In carrying out the process according to the invention, the static phase is mixed with the supporting solid and the mobile phase used to separate the component factors. The proportion of static phase to supporting solid will depend upon how much static phase the solid can take up. Thus, in the case of kieselguhr, this will in general take up about twice its own weight of static phase; we have found that a ratio of static phase to kieselguhr of from 6-3 parts, preferably 5 parts, of the former to 4 parts of the latter by weight is convenient.

In practice, after the static phase has been mixed with the supporting solid a column is preferably made through which the mobile phase can be passed. The starting material to be treated may either be dissolved in the mobile or the static phase, but we prefer to dissolve it in the static phase as this is a better solvent for E.129. Thus, it has been found convenient to make a saturated solution of E.129 in the static phase which is then mixed with the supporting solid. This is then placed at the top of the column and the mobile phase poured through it; the depth of this E.129-containing part of the column should preferably not be equal to more than half the total length of the column and should preferably not be more than 0.8 times the length of the rest of the column.

As development of the column proceeds, separation of the various factors will take place and it should be noted that of the three E.129 factors A, B and Z the order in which these move is Z, A, B, factor Z being the fastest. The factors can be separately recovered from different fractions of the eluate, or, less satisfactorily by cutting out the sections of the column containing the factors and extracting these sections.

The successive emergence of the factors can be followed by plotting the weight of residue on evaporating equal portions of eluate: or, more conveniently, by spot tests with ferric chloride solution, which gives an almost immediate red-brown colour with factor Z, and green with factors A and B.

In our preferred method of operation we develop the column first with cyclohexane-benzene mixture (e.g. 3:5) to remove the factor Z followed by A, then with benzene alone to remove factor B.

The factor A fraction can be further purified if desired by crystallisation, conveniently from ethyl acetate.

The factor Z fraction can be purified if desired by crystallisation from methanol or ethanol, either directly or after extraction with acid as described in application Ser. No. 735,941.

The factor B fraction can if desired be further purified by repeating the partition chromatography procedure.

By the process according to the invention, it is possible to obtain the said antibiotic factors in reasonably pure form, and substantially separate from one another. The process has particular application in the obtaining of substantially pure factor B as this factor has hitherto not been obtainable pure in simple manner.

In order that the invention may be well understood the following examples are given by way of illustration only:

*Example 1*

The solvent system was prepared in the following ratio—benzene 12.5: cyclohexane 7.5 (mobile phase): methanol 12: water 8 (static phase).

40 g. kieselguhr (acid-washed) supporting 60 ml. static phase was packed into a column of 3.0 cms. diameter to give a length of 27 cms.

3 g. crude E.129 were dissolved in 21 ml. of warm (40° C.) aqueous phase and supported on 15 g. kieselguhr which was packed to give a length of 10 cms.

The upper phase of the above system was passed through the column until the ferric chloride spot test no longer gave a reddish-brown colour. This volume of eluate contained the factor Z.

Weight of fraction=662 mg.

Spectroscopic analysis indicated that of this weight, 270 mg. were pure factor B.

Development was continued with solvent phase and the presence of factor A in the eluate was followed by the green colour given with ferric chloride solution. When this test was negative, the volume of eluate which had passed contained all factor A present and the weight of this fraction was 1.43 g. A quantitative ferric chloride estimation indicated a weight of 1.18 g. of factor A.

Benzene, saturated with aqueous phase, was then used to develop the column until no green colour was given with ferric chloride solution. This fraction weighed 806 mg., of which 720 mg. was pure factor B.

Stripping the column with methanol yielded a residue of 80 mg.

*Example 2*

A solvent system identical to that in Example 1 was used.

21 g. crude E.129 were dissolved in hot ethyl acetate (270 ml.). On cooling 4.7 g. factor A crystallised out and was removed. The mother liquors were taken to dryness. A column was prepared consisting of 380 g. kieselguhr supporting 475 ml. aqueous phase, of diameter 7.6 cms. and length 38 cms.

16 g. of solid from ethyl acetate solution were redissolved in 150 ml. aqueous phase and supported on 100 g. kieselguhr. This material was packed to a length of 9 cms. onto the top of the prepared column.

Solvent phase was passed through the column until no further red colour was obtained with ferric chloride solution.

Weight of fraction=4.06 g. of which 2.5 g. was found to be pure factor Z by spectroscopic analysis.

Further development with solvent phase until no green colour was given with ferric chloride was carried out.

Weight of A fraction=4.96 g. of which 3.0 g. was factor A.

Benzene was then used to elute the B fraction of the column, the weight of this being 5.8 g. The factor B content of this fraction was determined quantitatively and found to be 4.1 g.

Example 3

The solvent system used was benzene 20 (mobile phase): methanol 12: water 8 (static phase).

500 g. crude E.129 were dissolved in 4000 ml. hot ethyl acetate and yielded on cooling and filtration 125 g. crude factor A. Mother liquors were extracted with 3 x 1000 ml. N/2 hydrochloric acid to give a yield of 79 g. factor Z. Residues from ethyl acetate weighed 240 g. which were dissolved in 1000 ml. aqueous phase contained on 800 g. kieselguhr. This was packed onto a previously prepared 6 inch diameter column consisting of 2 kg. kieselguhr supporting 2.5 litres aqueous phase.

The column was developed with benzene only.

The presence of factor A in the first eluate was established by spot tests with ferric chloride and when the intensity of the green colour was reduced, the eluate following was taken to contain the factor B.

Volumes of benzene eluate were taken and treated individually. Each was reduced to a small bulk and precipitated with petroleum ether (40–60°). After filtering, drying and weighing, aliquots were taken for ferric chloride estimation.

|   | Volume, litres | Weight, g. | Purity, percent |
|---|---|---|---|
| 1 | 8 | 49 | 60 |
| 2 | 7 | 30 | 75 |
| 3 | 9 | 36 | 85 |
| 4 | 9 | 20 | 85 |
| 5 | 35 | 34 | 73 |

Example 4

The solvent system used was toluene 12.5: cyclohexane 7.5 (mobile phase): ethanol 12: water 8 (static phase).

20 g. kieselguhr supporting 25 ml. aqueous phase was packed into a column of 2.4 cms. diameter to a length of 19 cms.

100 mg. crude E.129 was dissolved in 5 ml. aqueous phase and supported on 4 g. kieselguhr. This was packed onto the column to a length of 4 cms.

Development with solvent phase was carried out, the first 150 ml. being taken as containing factor Z.

Weight of fraction=19 mg. Spectroscopic analysis indicated 9 mg. factor Z present.

Further development with mobile phase was continued until no green colour was given with ferric chloride solution. This eluate yielded 49 mg. of which 38.5 mg. were factor A. Toluene (saturated with aqueous phase) was then used to elute factor B from the column. Of this fraction, which weighed 33 mg., 22 mg. were calculated to be pure factor B.

Example 5

28 g. cellulose powder (standard grade) supporting 35 ml. of aqueous phase ($12CH_3OH:8H_2O$), were packed into a column 2.1 cm. diameter. The length of the celluose column was 17 cm.

100 mg. of crude E.129 was dissolved in 5 mls. aqueous phase and supported on 4 g. cellulose. Length of feed=3 cm.

The first 200 ml. of mobile phase (12.5 benzene: 7.5 cyclohexane) eluted factor Z.

Weight of Z fraction=19 mg.

The next 500 ml. of mobile phase eluted factor A (followed by green colour with 1% $FeCl_3$ in $C_2H_5OH$).

Weight of A fraction=41.2 mg.

The column was then eluted with 100% benzene to remove factor B (detected by green colour with $FeCl_3$).

Weight of B fraction=32 mg.

Analysis of fractions gave the following factor concentrations:

| | Percent |
|---|---|
| Factor Z | 17 |
| Factor A | 34 |
| Factor B | 28 |

Example 6

The solvent system consisted of benzene 12.5: cyclohexane 7.5 (mobile phase): methanol 14: water 6 (static phase).

6 g. crude E.129 were dissolved in 30 ml. of aqueous phase which were supported on 15 g. of acid-washed kieselguhr. This was packed onto a previously prepared column of 40 g. of acid-washed kieselguhr supporting 50 ml. of aqueous phase. The length of the column and feed respectively were 28 and 7 cms. and the diameter 3 cms.

The column was developed with solvent phase until no further red colour was obtained with ferric chloride solution.

This fraction weighed 1.20 g. of which 1.0 g. was found to be pure factor Z by spectroscopic analysis.

Further development with the same eluant was carried out until no further green colour was given with ferric chloride solution.

This fraction contained factor A and weighed 2.32 g. of which 1.55 g. was the pure factor.

The developing solvent was then changed to benzene (saturated with the aqueous phase) to remove factor B.

The B fraction weighed 1.64 g. and a quantitative ferric chloride estimation indicated 1.51 g. of pure factor.

Example 7

The solvent system used was benzene 12.5: cyclohexane 7.5 (mobile phase): ethylene glycol 15: water 5 (static phase).

A column was prepared (consisting of 20 g. of kieselguhr (acid washed) supporting 25 ml. of aqueous phase) of length 17 cms. and diameter 2.3 cms.

100 mg. crude E.129 was dissolved in 5 ml. of aqueous phase and supported on 4 g. of kieselguhr which was fed onto the column.

The first 150 ml. of eluting solvent yielded a fraction weighing 21 mg. containing 17 mg. pure factor Z.

The column was then developed with benzene and the eluate tested with ferric chloride solution at 50 ml. aliquots. After 200 ml. eluate the ferric chloride colour decreased suddenly then slowly increased again as more development took place.

The first 200 mls. benzene gave a fraction of weight 50 mg. of which 32 mg. was pure factor A. A further 400 ml. of eluate yielded 32 mg. of solid of which 24 mg. was pure factor B.

Example 8

The solvent system used was chloroform 10: carbon tetrachloride 90 (mobile phase): methanol 3: water 2 (static phase).

20 g. of acid washed kieselguhr containing 25 ml. of aqueous phase was packed into a glass column of 2.1 cm. diameter to a height of 20 cms.

100 mg. crude E.129 was dissolved in 5 ml. of aqueous phase which was supported on 4 g. kieselguhr. This was packed onto the prepared column to a height of 4.5 cm. and developed with the chloroform-carbon tetrachloride solvent (saturated with aqueous phase).

Factor Z was eluted in the first 50 ml. eluate. The fraction weight was 21 mg. of which 17 mg. was found to be pure factor Z.

Further development with the same solvent was carried out and 50 ml. aliquots collected. A decrease in the colour reaction with ferric chloride after 200 ml. eluate was collected indicated that all factor A had come off the column. This fraction weighed 45 mg. of which 36 mg. was pure factor A.

The eluting solvent was then changed to chloroform 20: carbon tetrachloride 80. The column was developed with this until no further colour was obtained with ferric chloride solution.

The weight of this fraction was 30 mg. which contained 24.5 mg. pure B factor.

*Example 9*

The solvent system used was toluene 20 (mobile phase): methanol 12: water 8 (static phase).

A kieselguhr column was prepared as in Example 8, and the feed consisting of 100 mg. crude E.129 introduced onto the column in the same way.

Factor Z was contained in the first 100 ml. of toluene eluted. This fraction, which weighed 21 mg., contained 17 mg. pure factor Z.

Further development with 300 ml. toluene was carried out to remove factor A (detected by the colour with ferric chloride solution). The fraction weighed 48 mg. of which 36 mg were pure factor A.

The developing solvent was then changed to 20% chloroform in toluene in order to remove factor B. 300 ml. of this eluate contained 29 mg. of which 24 mg. was factor B.

We claim:

1. A process for the separation of at least two of the three principal factors of an antibiotic mixture containing the factors produced by the culturing of *Streptomyces ostreogriseus* NRRL 2558, comprising dissolving said antibiotic mixture in a first solvent comprising a mixture of water and at least one alcohol selected from the group consisting of a lower monohydric alcohol and a lower dihydric alcohol; supporting the resulting solution of said antibiotic mixture in said first solvent on a solid adsorbent having substantially no adsorptive capacity for any of said factors; packing said supported solution of said antibiotic mixture into a column; passing through said column a second solvent comprising an organic liquid selected from the group consisting of an aromatic hydrocarbon, a mixture of chloroform and an organic compound selected from the group consisting of cyclohexane, carbon tetrachloride and a higher ether and a mixture of ethyl acetate and an organic compound selected from the group consisting of cyclohexane, carbon tetrachloride and a higher ether; and collecting at least two and no more than three successive fractions of said second solvent after it has passed through said column, each of said collected fractions containing substantially all of a particular one of said factors.

2. A process as claimed in claim 1 in which a portion of one of said factors is first removed by dissolving said antibiotic mixture in hot ethyl acetate, cooling the resulting solution and separating the one of said factors which crystallizes from the solution upon cooling.

3. A process as claimed in claim 2 in which after removal of a portion of said one factor, a portion of a second factor is removed from the remaining antibiotic mixture by acid extraction.

4. A process as claimed in claim 1 in which three successive fractions are collected and said second solvent is an aromatic hydrocarbon which, when the first two of said fractions are being collected, is diluted with at least one organic liquid selected from the group consisting of cyclohexane, carbon tetrachloride and a higher ether and is undiluted when said third fraction is being collected.

5. A process as claimed in claim 4 in which said aromatic hydrocarbon is benzene.

6. A process as claimed in claim 4 in which said aromatic hydrocarbon is toluene.

7. A process as claimed in claim 1 in which said first solvent is a mixture of methyl alcohol and water in the proportions of 2:1 to 1:2.

8. A process as claimed in claim 7 in which said first solvent is a mixture of approximately 3 parts of methyl alcohol to approximately 2 parts of water.

9. A process as claimed in claim 1 in which said absorbent is selected from the group consisting of kieselguhr, powdered cellulose, starch and silica.

10. A process as claimed in claim 1 in which three successive fractions are collected and said first solvent is a mixture of methyl alcohol and water in the proportion of 2:1 to 1:2 and said second solvent, when the first two fractions are being collected, is a mixture of benzene and cyclohexane and, when the third fraction is being collected, is benzene alone.

11. A process as claimed in claim 10 in which the proportion of benzene to cyclohexane is approximately 5:3.

References Cited in the file of this patent

Somer et al.: Antibiotics and Chemotherapy, 5:11, pp. 632–639, November 1955.

Kuehl et al.: J.A.C.S., 73:4, pp. 1770–1773, April 1951.